(12) United States Patent
Chamorro et al.

(10) Patent No.: US 7,477,479 B2
(45) Date of Patent: Jan. 13, 2009

(54) TAPE DRIVE BEZEL FOR USE WITH MULTIPLE ACCESSORS

(75) Inventors: German Alberto Chamorro, Vail, AZ (US); Michael Philip McIntosh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 10/831,404

(22) Filed: Apr. 23, 2004

(65) Prior Publication Data

US 2005/0237662 A1  Oct. 27, 2005

(51) Int. Cl.
G11B 15/675 (2006.01)
G11B 15/68 (2006.01)

(52) U.S. Cl. .................................. 360/96.51; 360/92.1
(58) Field of Classification Search .................. 360/92, 360/96.5, 93, 94, 92.1, 96.51
See application file for complete search history.

(56) References Cited

U.S. PATENT DOCUMENTS

| | | | |
|---|---|---|---|
| 5,691,859 A * | 11/1997 | Ulrich et al. .................. 360/92 |
| 5,914,831 A | 6/1999 | Lass et al. .................. 360/96.5 |
| 5,973,876 A * | 10/1999 | Yeakley et al. ................. 360/92 |
| 6,208,483 B1 * | 3/2001 | Manes et al. ................... 360/92 |
| 6,433,329 B1 | 8/2002 | Butka et al. .................. 250/221 |
| 6,473,706 B1 | 10/2002 | Gallo et al. .................. 702/105 |
| 6,675,063 B2 | 1/2004 | Bosley et al. ............... 700/218 |
| 2004/0165489 A1* | 8/2004 | Goodman et al. ............. 360/92 |

* cited by examiner

Primary Examiner—Craig A Renner
(74) Attorney, Agent, or Firm—William D. Gill; Jeffrey P. Aiello (57) ABSTRACT

A tape drive bezel forming a front surface of a tape drive is provided, the bezel comprising a housing, an opening in the housing for receiving a tape cartridge, a plurality of targets or fiducials, each fiducial providing an alignment target for one of a plurality of robotic assemblies to insert or remove a tape cartridge in the opening of the housing, and a plurality of projections extending from the front of the housing forming legs for supporting the tape drive and for protecting the fiducials from handling damage. The plurality of fiducials provided on the bezel are compatible with the plurality of robotic assemblies used by different tape library systems enabling a tape drive fitted with the bezel to be used interchangeably with the different libraries.

4 Claims, 6 Drawing Sheets

TAPE DRIVE BEZEL FOR USE WITH MULTIPLE ACCESSORS

BACKGROUND OF THE INVENTION

1. Field of the Invention

This invention relates in general to tape drives and in particular to tape drives having bezels which accommodate magnetic tape cartridges.

2. Description of the Related Art

Magnetic tape cartridges or cassettes are used to house magnetic tape as the medium for recording and storage of information in magnetic tape libraries. Read and write operations of information to and from the tape medium is carried out by insertion of the tape cartridge into a read/write device referred to as a tape drive, tape recorder or tape deck. Tape drives are usually designed as a component of a specific tape library product. Insertion and removal of a tape cartridge into and from a tape drive is usually done by an accessor comprising an automated gripper device through a bezel forming a front face of the tape drive.

The bezel, which provides a physical interface between the gripper and the tape drive, is required to have an opening, or window, to accommodate the shape of the tape cartridge and a number of features which interact with the gripper to facilitate the mechanical processes for insertion and removal of the tape cartridge by the gripper. Typically, a required feature on the bezel is a target or fiducial that the gripper senses in order to locate the window in which to insert or from which to remove a tape cartridge. A problem with the present art is that each library product uses fiducials that differ in location, shape, size and reflectivity so that only tape drives having a bezel with the unique fiducials of that library can be used with that library. Another problem is that the fiducials on the bezels forming the front face of the tape drive are susceptible to damage when the tape drive is manually removed from the library. Therefore, there is a need for an improved bezel design that overcomes these problems.

SUMMARY OF THE INVENTION

In accordance with the principles of the present invention, there is disclosed a tape drive bezel forming a front surface of a tape drive, the bezel comprising a housing, an opening in the housing for receiving a tape cartridge, a plurality of targets or fiducials, each fiducial providing an alignment target for one of a plurality of robotic assemblies to insert or remove a cartridge in the opening of the housing, and a plurality of projections extending from the front of the housing forming legs for supporting the tape drive and for protecting the fiducials from handling damage. The plurality of fiducials provided on the bezel are compatible with the plurality of robotic assemblies used by different tape library systems enabling a tape drive fitted with the bezel to be used interchangeably with the different libraries.

An embodiment of the bezel of the present invention comprises a housing for engaging the front of a tape drive, an opening in the housing for receiving a tape cartridge, three fixed targets or fiducials mounted on fiducial support structures, a slot for supporting a removably mounted fourth fiducial, and three integrally formed legs extending from the front surface of the housing. Each fiducial is positioned on the front surface of the housing so that an optically reflective surface provides an alignment target for one of a plurality of robotic assemblies to insert or remove a tape cartridge in the opening. The three legs extend from the front surface of the housing a height greater than the height of the fiducials above the housing surface so that if the housing of the tape drive is in contact with a surface, the legs provide support for the tape drive without the fiducials contacting the surface.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1A:
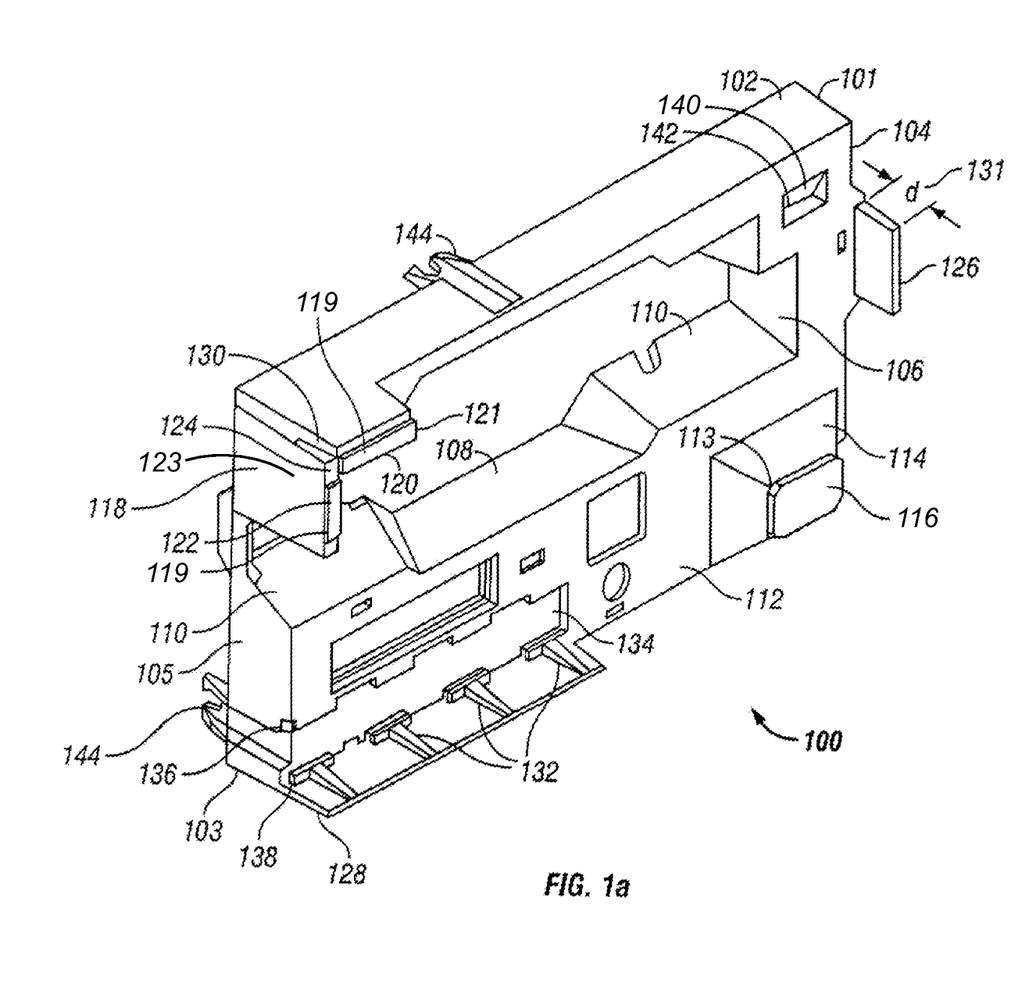
FIG. 1*a* is a front perspective view of an embodiment of a tape drive bezel according to the present invention.
Figure 2:
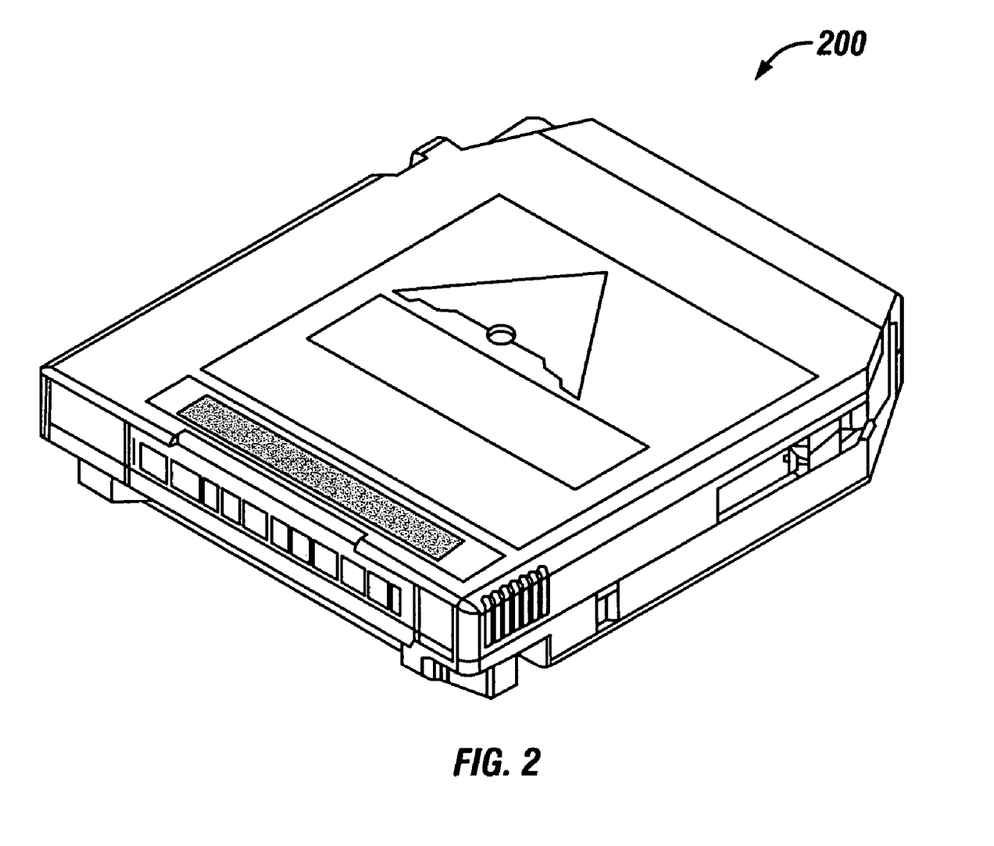
FIG. 2 is a perspective view of an exemplary tape cartridge.

FIG. 1 is front perspective view of an embodiment of a tape drive bezel 100 for a tape drive system. The bezel 100 comprises a housing 101 having a substantially rectangular shape that engages a front surface of a tape drive. The housing 101 has a top edge 102, a bottom edge 103, a left edge 104, a right edge 105 and a window or opening 106 for receiving a tape cartridge 200 shown in FIG. 2. The opening 106 is essentially rectangular to accommodate passage of the tape cartridge 200 through the bezel to the tape drive. The longer dimension of the rectangular shaped opening 106 lies parallel to the top edge 102. The horizontal surface 108 defining the bottom of the opening 106 has two ramps 110 that slope upward from front surface 112 of the housing 101 to guide the bottom surface of the tape cartridge upward into the opening of the slot when the cartridge is inserted into the tape drive by a gripper forming a part of a robotic assembly (actuator) of a tape library system for inserting or removing a tape cartridge.

A novel feature of the bezel 100 of the present invention is the provision of a plurality of targets or fiducials for providing alignment targets for a robotic assembly during loading and unloading operations of a tape cartridge to and from a tape drive. In the embodiment shown in FIG. 1*a*, four fiducials are provided to enable use of the tape drive with a plurality of different tape library products.

A first fiducial support 114 having a truncated pyramidal shape protruding from the front surface 112 of the bezel provides a supporting structure for a first fiducial 116 for use with a first tape library. The first fiducial 116 is fixed on the flat protruding surface 113 parallel to the front surface of the bezel and provides a target surface which is sensed by a positioning sensor on the tape cartridge loading gripper for positioning of the gripper with respect to the bezel 100 during or prior to the operation of loading or unloading a tape cartridge from a first library into the tape drive.

A second fiducial support 118 having an L-shape protruding from the front surface 112 provides support for a second fiducial 119 for use with a second tape library. The second fiducial 119 comprises a horizontal fiducial element 120 and a vertical fiducial element 122. A vertical leg 123 of the L-shaped second support is located at and parallel to the right edge 105 of the bezel and a horizontal leg 121 of the L-shaped support is located a short distance below and parallel to the top edge 102 of the bezel. The L-shaped second support has a flat surface 124 protruding from and parallel to the front surface 112 of the bezel. The horizontal fiducial element 120 having a rectangular shape is fixed to the horizontal leg 121 and the vertical fiducial element 122 having a rectangular shape is fixed to the vertical leg 123. The horizontal and vertical fiducial elements provide alignment targets for sensing by a positioning sensor or sensors on a tape cartridge loading gripper of a tape library system for positioning of the gripper with respect to the bezel 100 during the operation of loading or unloading a tape cartridge from a second library into the tape drive.

A third fiducial 140 for use with a third tape library is located near the upper left corner of the housing 101. The third target comprises a reflective element recessed from the surface 112 that is inserted in an receiving opening 142 formed in the housing. The reflective element of the third fiducial 140 provides an alignment target for sensing by a positioning sensor on a tape cartridge loading gripper of a tape library system for positioning the gripper with respect to the bezel 100 during the operation of loading or unloading a tape cartridge from a third tape library into the tape drive.

Figure 1B:
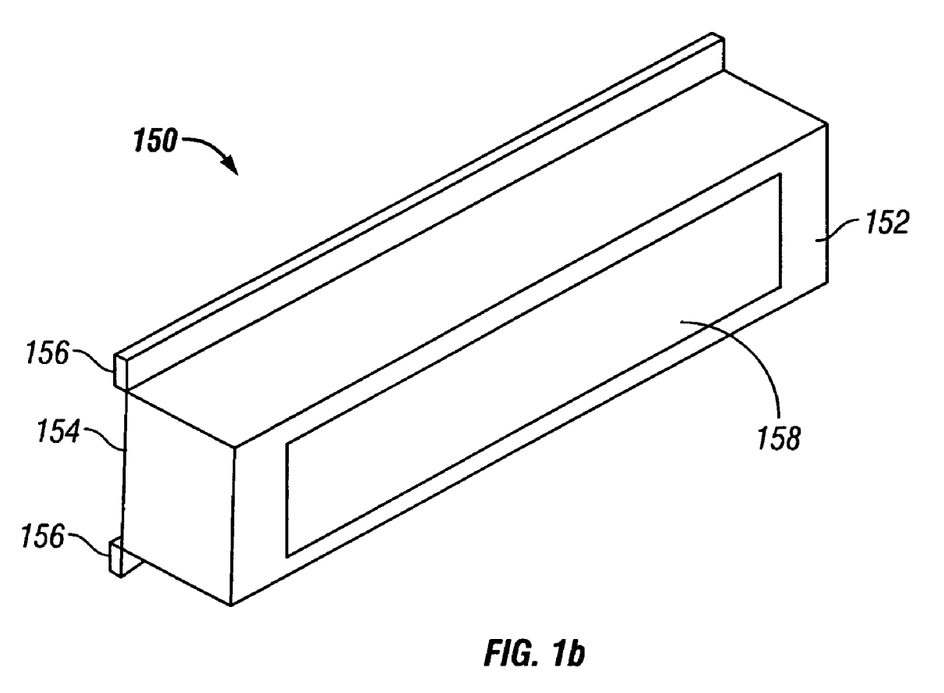
FIG. 1*b* is a perspective view of a removable fiducial for use with the bezel of FIG. 1*a*.

The housing 100 includes a slide guide or receiving slot 134 having upper and lower grooves 136 and 138, respectively, for holding a barcode label (not shown). A barcode scanner on the gripper reads identification information for a particular tape library system from the barcode label. Alternatively, the slot 134 may be used to support a fourth fiducial 150 shown in FIG. 1b for use with a fourth tape library. The fourth fiducial 150 is a generally rectangular shaped structure having a front surface 152 and a rear edge 154. Rails 156 formed along the upper and lower edges of the rear edge 154 fit in a sliding relationship into the upper and lower grooves 136 and 138 of slot 134 to position the fourth fiducial 150 on the housing. A reflective surface element 158 fixed on the front surface 154 provides an alignment target for sensing by a positioning sensor on a tape cartridge loading gripper of a tape library system for positioning the gripper with respect to the bezel 100 during the operation of loading or unloading a tape cartridge from a fourth tape library into the tape drive. Fourth fiducial 150 is easily installed or removed as needed for use of the tape drive having the universal bezel 100 with a compatible tape library.

For use with a gripper having a light source and an optical sensor device for detecting the fiducials used for positionally locating the gripper with respect to the bezel, the fiducials have reflective surfaces for reflection of light emitted by a light emitting diode (LED), a laser or other suitable source of a well-defined light beam. The fiducials are fixed to the fiducial supporting structures so as to provide well-defined references for positional location of features on the bezel by the sensor system on the gripper forming part of a robotic assembly on the actuator of a library system. Alternatively, fiducials may be used that are compatible with other sensor devices including, but not limited to, capacitive, electrostatic, magnetic, radio-frequency, acoustic and thermal sensors.

Another novel feature of the bezel 100 of the present invention is the provision of a plurality of supports or legs for providing stable support and protection of the tape drive deck when it is manually removed from a tape library. The legs allow the tape drive to be set down and supported on the bezel face without risk of damage to the fiducials and other features on the front surface 112 of the housing 101. In the embodiment shown in FIG. 1a, three legs provide a stable three point support for the tape drive. A first leg 126 extends from the front surface 112 of the housing 101 at the left edge 104. A second leg 128 extends from the surface 112 at the right end of the bottom edge 103. A third leg 130 extends from the surface 112 at the right end of the top edge 102. The legs 126, 128 and 130 are preferably all formed as integral molded parts of the housing 101 and they all extend an equal distance d 131 away from the surface 112. Ribs 132 may be provided on the legs to provide greater strength and rigidity. Alternatively, one or more of the plurality of legs may be separate support elements fixed to the housing by suitable attachment means including, but not limited to, adhesives, bolts, screws and rivets. The distance d that the legs extend away from surface 112 is chosen to be larger than the largest distance that any one of the reflective surfaces of fiducials 116, 119, 140 and 150 protrudes from surface 112. By choosing d to be larger than the distance of any of the fiducial surfaces from the housing front surface 112, the legs 126, 128 and 130 serve to protect the fiducials from damage when the tape drive is manually removed from a tape library system and set on the bezel end on a floor or other supporting surface.

Housing 101 is preferably made of polycarbonate material and is formed by a molding process well known to the art. Bezel 100 is fixed on a front surface of a tape drive by screws, bolts or clamps using attachment tabs 144 formed as integral parts of the molded housing 101.

Figure 3:
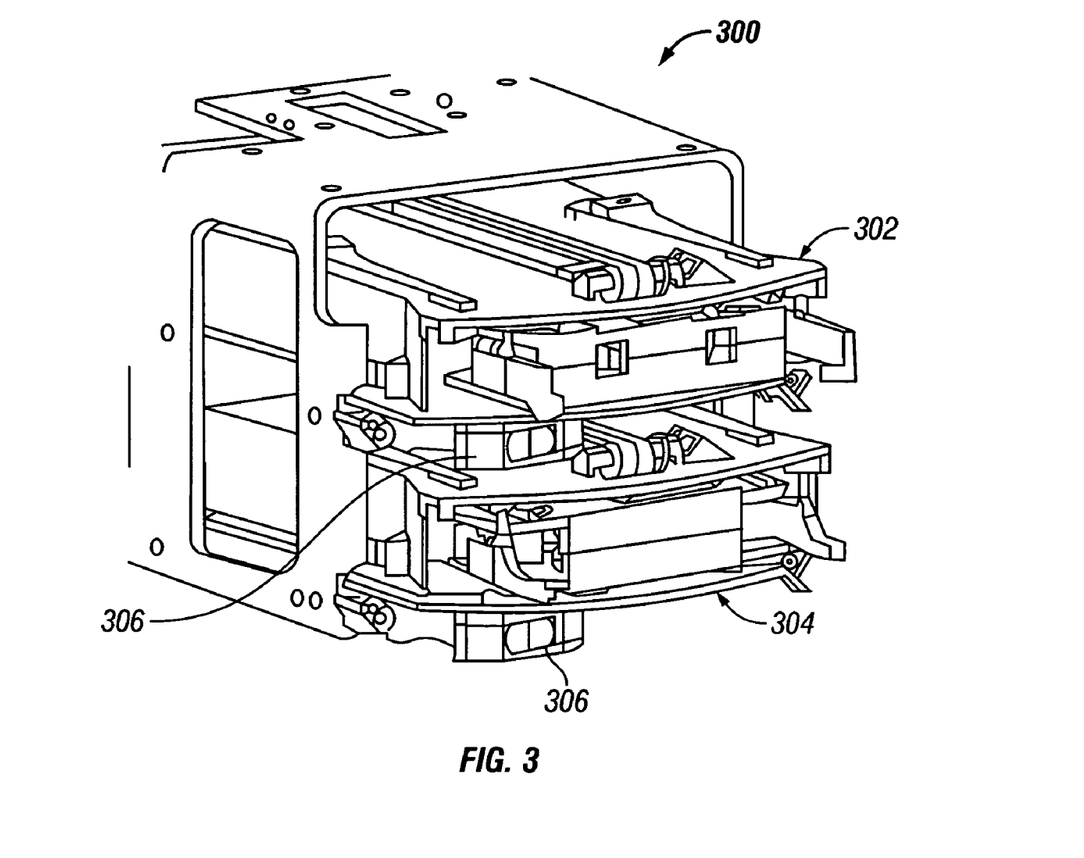
FIG. 3 is a perspective view of a gripper cage supporting two grippers.

FIG. 3 is a perspective view of a gripper cage 300 forming part of a robotic assembly for handling tape cartridges in a tape library system using the bezel 100 of the present invention. The gripper cage 300 supports two grippers 302, 304 each operatively associated with a sensor 306. Sensor 306 usually comprises an LED source and a light detector or camera for sensing the position of one of the fiducials 116, 119, 140 and 150 of the bezel 100. Sensor 306 may be positioned differently with respect to the grippers 302 and 304 for different library systems. A different one of the fiducials 116, 119, 140 and 150 may be sensed by the sensor 306 for a different library system using bezel 100 in accordance with the present invention. Using the appropriate fiducial for the gripper of the library system being used, the sensor on this gripper locates the drive and then locates the cartridge from calibrated mathematical relationships. The bezel 100 must be designed so that the mechanisms of the gripper do not interfere with the bezel and vice versa.

Figure 4:
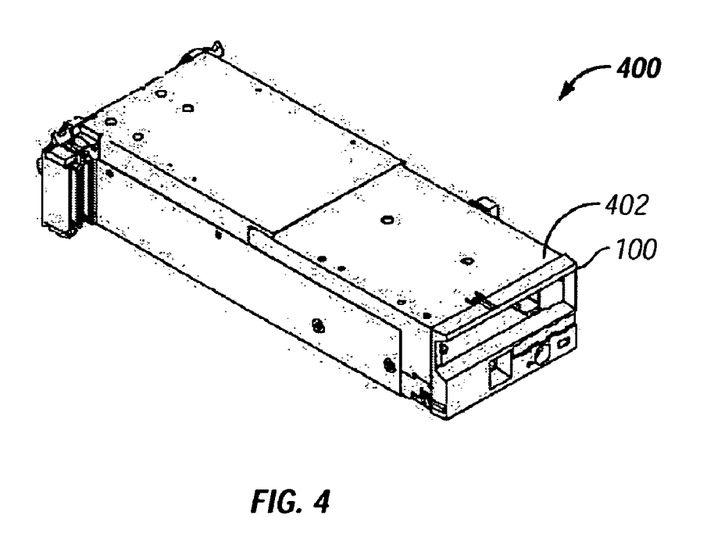
FIG. 4 is a front perspective view of a tape drive.

A tape drive 400 incorporating the tape drive bezel 100 of the present invention is described with reference to FIGS. 4 and 5. The tape drive 400 has a generally rectangular shape housing a magnetic tape drive system 500. The tape drive 400 has a front end 402 on which bezel 100 is mounted.

Figure 5:
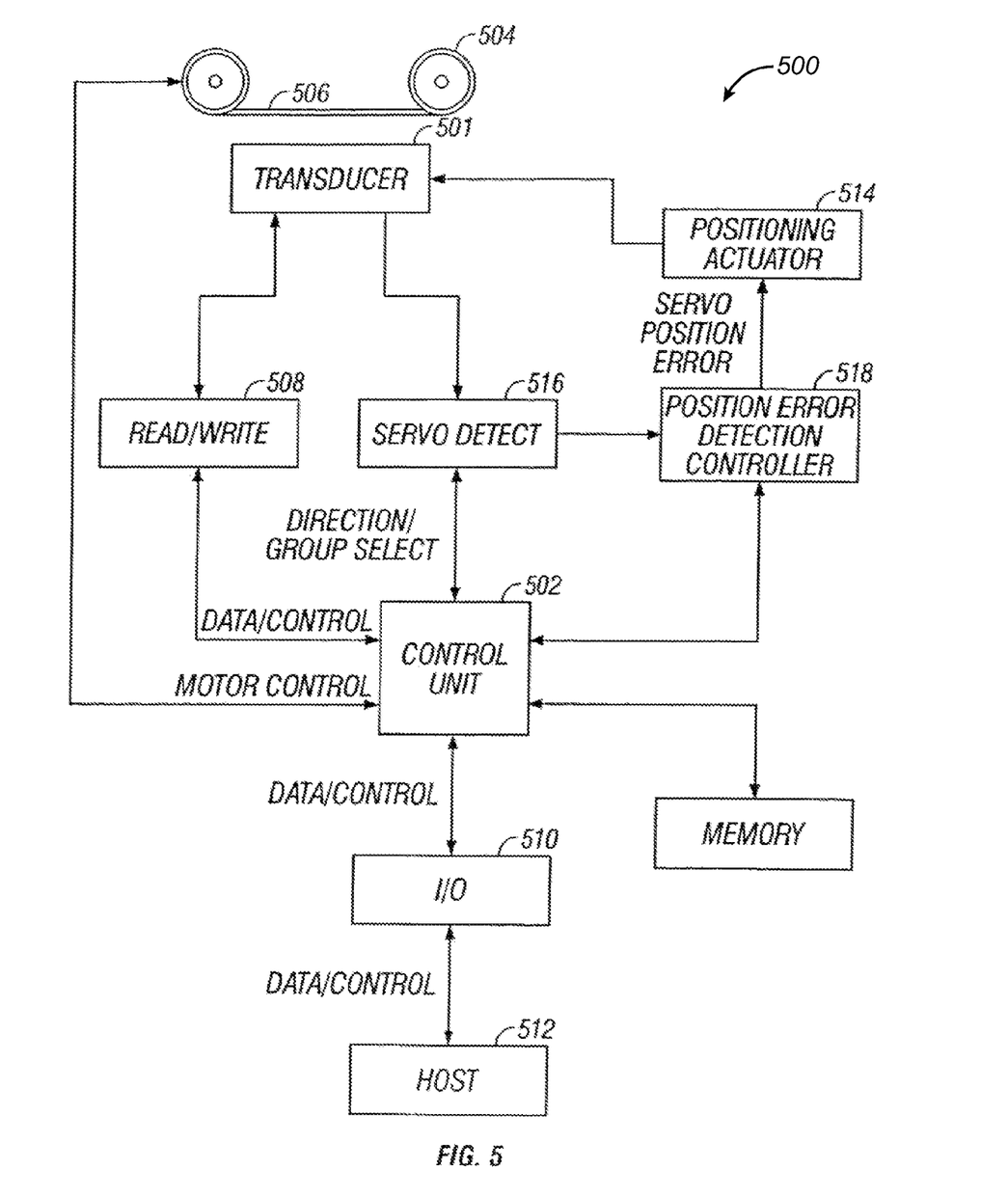
FIG. 5 is a simplified diagram of a tape drive system.

FIG. 5 is a simplified diagram of an embodiment of a magnetic tape drive system 500 for writing and reading information to and from magnetic media in a magnetic tape cartridge. A tape drive control unit 502 provides a motor control signal to rotate tape reels 504 and move magnetic tape 506 across the read/write transducer head 501. Read/write channel 508 transmits read/write signals between the read/write transducer 501 and the control unit 502. The data is communicated through I/O channel 510 with host 512. Lateral positioning of the transducer 501 with respect to the tape 506 is accomplished by coarse and fine positioning actuators 514. The lateral repositioning by a coarse actuator is required to access the various tracks of the tape 506 with the transducer 501. A servo system and fine actuator may be employed for accurate lateral repositioning of the transducer 501. An exemplary servo system includes a servo detector 516 to detect both the track that the head is currently on and whether the head is off center. Control unit 502 indicates the track address of a desired new track to position error detection controller 518 for repositioning the head. Servo detector 516 indicates the current track to position error detection controller 518, and the controller provides a servo position error signal to the coarse actuator of positioning actuators 514 which repositions the transducer 501 to the new track. The servo system also provides track following signals to the fine actuator of positioning actuators 514 so that the tracks on tape 506 may be closely spaced.

Figure 6:
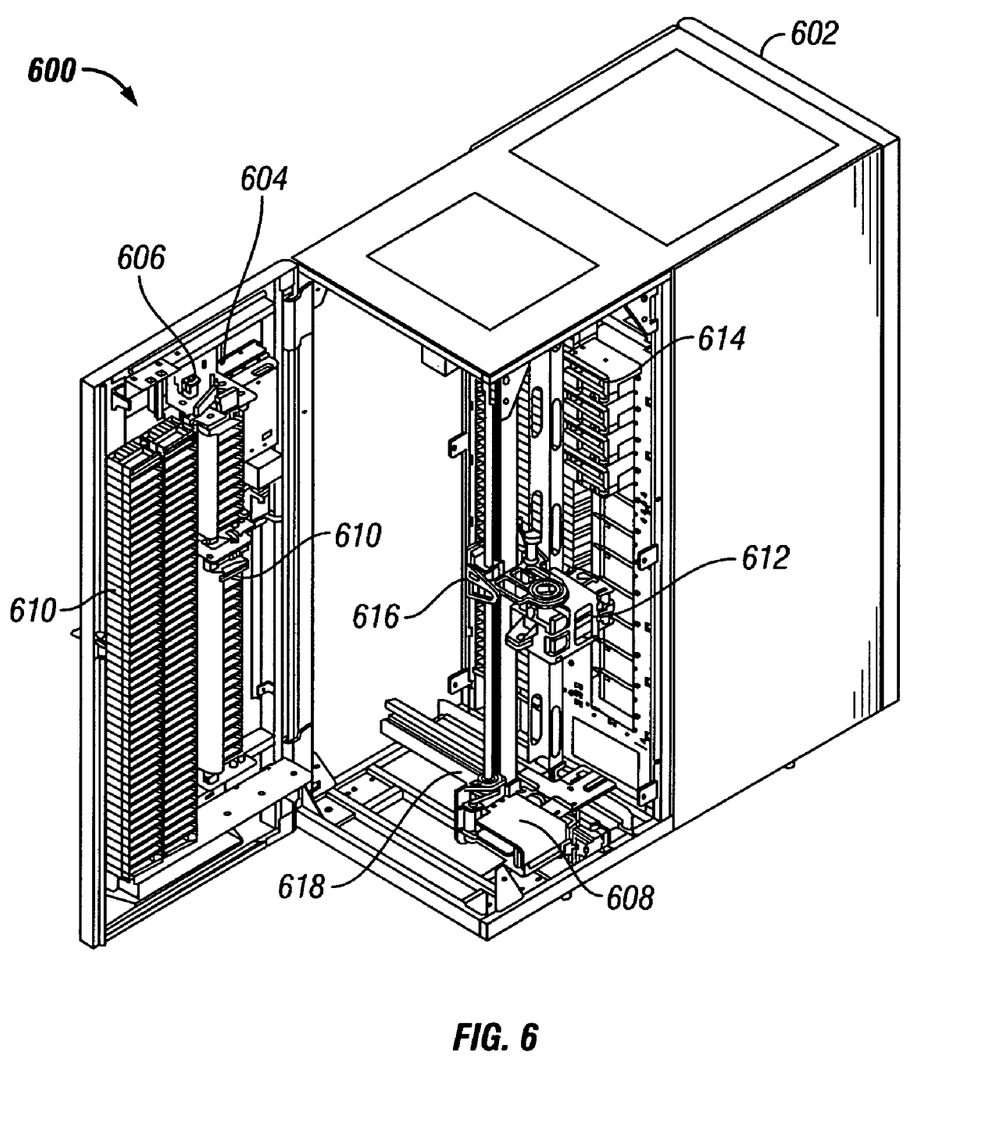
FIG. 6 is a front perspective view of a tape library.

FIG. 6 shows front perspective view of an exemplary automated tape library 600 using a tape drive 614 incorporating the bezel 100 of the present invention. Tape library 600 comprises a frame 602 containing an operator panel 604, an I/O 606, an accessor 608, tape cartridge storage slots 610, a gripper cage 612 and a plurality of tape drives 614. Accessor 608 moves vertically and horizontally on Y-rail 616 and X-rail 618, respectively, to provide access to tape cartridge slots 610 and tape drives 614 by grippers mounted on the gripper cage 612. The frame 602 is designed to hold up to 12 tape drive 614 (four are shown in FIG. 6). A tape drive library may consist of an assembly of a plurality of frames 602.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

We claim:

1. A bezel for a tape drive, comprising:
 a housing for engaging a front of a tape drive;
 an opening in the housing for receiving a tape cartridge; and
 a plurality of unique fiducials located on a front surface of the housing, each unique fiducial providing an alignment target for aligning a corresponding unique robotic assembly to insert or remove the tape cartridge through the opening in the housing, said plurality of unique fiducials comprising:
  a first unique fiducial for use with a first robotic assembly comprising a first fiducial support having a truncated pyramidal shape protruding from the front surface of the housing, the first fiducial support having a flat support surface, and a flat, generally rectangular, fiducial affixed to the flat support surface of the first fiducial support;
  a second unique fiducial for use with a second robotic assembly comprising a second fiducial support having a fiducial support having an L-shape protruding from the front surface of the housing, the second fiducial support supporting a second fiducial, the second fiducial comprising a horizontal fiducial element and a vertical fiducial element, the vertical fiducial element extending parallel to a right edge of the housing and the horizontal fiducial element extending parallel to a top edge of the housing;
  a third unique fiducial for use with a third robotic assembly comprising a reflective, generally rectangular element recessed from the front surface of the housing; and
  a unique removably mounted fourth fiducial for use with a fourth robotic assembly, the fourth fiducial comprising a generally rectangular structure having a front surface and a rear edge, the rear edge of the fourth fiducial configured to couple to a slot formed in the front surface of the housing for positioning the fourth fiducial on the housing, a reflective surface element fixed on the front surface of the fourth fiducial to provide an alignment target for sensing by a positioning sensor of the fourth robotic assembly; and
 a plurality of integrally formed legs extending from the front surface of the housing at a height greater than a height of each unique fiducial of the plurality of unique fiducials, such that if the housing of the bezel is in contact with a surface, the legs provide support for the tape drive without the plurality of fiducials contacting the surface, each leg extending an equal distance from the front surface of the housing.

2. A tape drive, comprising:
 a bezel for receiving a tape cartridge containing a magnetic recording tape, said bezel comprising;
  a housing for engaging a front of the tape drive;
  an opening in the housing for receiving the tape cartridge; and
  a plurality of unique fiducials located on a front surface of the housing, each unique fiducial providing an alignment target enabling a corresponding unique robotic assembly to insert a tape cartridge through the opening in the housing into the tape drive or remove a tape cartridge from the tape drive through the opening in the housing, the plurality of unique fiducials comprising:
   a first unique fiducial for use with a first robotic assembly comprising a first fiducial support having a truncated pyramidal shape protruding from the front surface of the housing, the first fiducial support having a flat support surface, and a flat, generally rectangular, fiducial affixed to the flat support surface of the first fiducial support;
   a second unique fiducial for use with a second robotic assembly comprising a second fiducial support having a fiducial support having an L-shape protruding from the front surface of the housing, the second fiducial support supporting a second fiducial, the second fiducial comprising a horizontal fiducial element and a vertical fiducial element, the vertical fiducial element extending parallel to a right edge of the housing and the horizontal fiducial element extending parallel to a top edge of the housing, and
   a third unique fiducial for use with a third robotic assembly comprising a reflective, generally rectangular element recessed from the front surface of the housing;
 a motor drive for moving the magnetic recording tape linearly and bidirectionally;
 a magnetic head for magnetically recording data on the magnetic recording tape and for sensing magnetically recorded data on the magnetic recording tape;
 an actuator for positioning said magnetic head to access various tracks on the magnetic recording tape; and
 a read/write channel coupled electrically to the magnetic head for magnetically recording data on the magnetic recording tape and for reading data recorded on the magnetic recording tape.

3. The tape drive as recited in claim 2, wherein the bezel further comprises:
 a plurality of integrally formed legs extending from the front surface of the housing at a height greater than a height of each unique fiducial of the plurality of unique fiducials, such that if the housing of the bezel is in contact with a surface, the legs provide support for the tape drive without the plurality of fiducials contacting the surface, each leg extending an eciual distance from the front surface of the housing.

4. The tape drive of claim 2 further comprising:

a unique removably mounted fourth fiducial for use with a fourth robotic assembly, the fourth fiducial comprising a generally rectangular structure having a front surface and a rear edge, the rear edge of the fourth fiducial configured to couple to a slot formed in the front surface of the housing for positioning the fourth fiducial on the housing, a reflective surface element fixed on the front surface of the fourth fiducial to provide an alignment target for sensing by a positioning sensor of the fourth robotic assembly.

* * * * *